(12) United States Patent
Zaitsev

(10) Patent No.: US 7,925,874 B1
(45) Date of Patent: Apr. 12, 2011

(54) ADAPTIVE CONFIGURATION OF CONFLICTING APPLICATIONS

(75) Inventor: Oleg V. Zaitsev, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 12/892,997

(22) Filed: Sep. 29, 2010

(30) Foreign Application Priority Data

May 18, 2010 (RU) .................................. 2010119563

(51) Int. Cl.
*G06F 9/00* (2006.01)
(52) U.S. Cl. ............. 713/1; 713/100; 718/104; 718/105
(58) Field of Classification Search .............. 713/1, 100; 718/102, 103, 104, 105
See application file for complete search history.

(56) References Cited

U.S. PATENT DOCUMENTS

| | | | |
|---|---|---|---|
| 5,870,731 | A | 2/1999 | Trif |
| 6,564,369 | B1 * | 5/2003 | Hove et al. .................... 717/121 |
| 7,028,019 | B2 | 4/2006 | McMillan |
| 2005/0096877 | A1 | 5/2005 | Shimazaki |
| 2005/0251804 | A1 * | 11/2005 | Musta et al. ................. 718/100 |
| 2006/0184616 | A1 | 8/2006 | Park |
| 2007/0006217 | A1 | 1/2007 | Tammana |
| 2009/0055340 | A1 | 2/2009 | Lakshminarayanan et al. |
| 2009/0094596 | A1 | 4/2009 | Kuiper |

FOREIGN PATENT DOCUMENTS

| | | |
|---|---|---|
| EP | 1329811 | 7/2003 |
| EP | 1254537 | 12/2005 |
| JP | 2006-235866 | 7/2006 |

\* cited by examiner

*Primary Examiner* — Dennis M Butler
(74) *Attorney, Agent, or Firm* — Arent Fox LLP; Michael Fainberg

(57) ABSTRACT

Disclosed are systems, methods and computer program products for adaptive configuration of conflicting applications. An example method comprises collecting system configuration information from a computer system, including system hardware and software information. The method further comprises monitoring system resource utilization during execution of a first program and one or more second programs. The method further comprises determining one or more critical levels of system resource utilization by applying fuzzy logic rules to the collected system configuration information. When the monitored system resource utilization exceeds the determined critical level for a predetermined period of time, determining, based on the collected software information, if the first program conflicts with execution of one or more second programs. Determining whether conflicting second programs are harmful to the computer system and changing configuration settings of the first program to resolve conflicts with the conflicting second programs that are harmless.

20 Claims, 7 Drawing Sheets

ADAPTIVE CONFIGURATION OF CONFLICTING APPLICATIONS

CROSS-REFERENCE TO RELATED APPLICATIONS

This application claims benefit of priority under 35 U.S.C. 119(a) to a Russian patent application no. 2010119563 filed on May 18, 2010, which is incorporated by reference herein.

TECHNICAL FIELD

The present disclosure relates generally to the field of computer science and, in particular, to systems, methods and computer program products for adaptive configuration of conflicting applications in order to improve system resource utilization.

BACKGROUND

Modern computer applications are generally resource intensive. Antivirus applications are even more so because they interact extensively with many hardware and software components of computer systems on which they run during complex system scans and other operations. Despite the fact that developers constantly improve operation of antivirus programs and their interaction with computer systems, the demand for system resources by antivirus programs continues to grow steadily, due to the increasing complexity and growing number of malicious software, such as viruses, worms, spyware and other types of malware.

Antivirus programs also frequently interfere with operation of conflicting programs. For example, an antivirus program may identify as malicious some action of a harmless application and, subsequently, limit access of this conflicting application to various system resources, such as memory, system registry, network and other. Due to this interference by the antivirus program, the conflicting applications cannot execute properly and have to repeat their requests for system resources, which further deteriorate overall system performance. The situation is exacerbated in enterprise environments, where applications are often executed on servers and accessed by system user on schedule, and interference by an antivirus program significantly slows down operation of such applications and impairs productivity of the users.

Accordingly, there is need for a more effective technique for conflict resolution among resource-intensive software applications, such as antivirus programs and other.

SUMMARY

Disclosed herein are systems, methods and computer program products for adaptive configuration of conflicting applications. In one example embodiment, a system for adaptive configuration of conflicting applications includes a software agent that may be installed on a computer system that runs a plurality of programs, including an antivirus application and other resource-intensive applications. The software agent is configured to collect system configuration information, including system hardware and software information and forward the collected information to a remote decision engine. The decision engine uses the provided system information and sets of fuzzy logic rules to determine critical levels of system resource utilization, including a critical level of system resource utilization by the entire computer system and a critical level of system resources utilization by the antivirus program.

The software agent then monitors system resource utilization and determines when it exceeds the determined critical levels for a predetermined period of time. The software agent then instructs the decision engine to determine, based on the collected software information, if the antivirus program interferes with execution of other programs on the computer system, which causes excess system resource utilization. The decision engine uses knowledge base of known computer software to determine if programs executing on the computer system conflict with the antivirus program and if conflicting programs are harmful to the computer system. If the conflicting programs are harmless, the decision engine uses conflict resolution rules to determine how to adjust configuration setting of the antivirus program to resolve interference with execution of conflicting programs that are harmless to the computer system. The decision engine then instructs the software agent to adjust configuration setting of the antivirus application to remove conflicts with other programs running on the computer system.

In one example embodiment, a method for adaptive configuration of conflicting applications comprises collecting system configuration information from a computer system. The method further comprises monitoring system resource utilization during execution on the computer system of a first program and one or more second programs. The first program includes an antivirus program. The method further comprises determining one or more critical levels of system resource utilization by applying fuzzy logic rules to the collected system configuration information. The critical levels include a critical level of system resource utilization by the entire computer system and a critical level of system resources utilization by the first program only. When the monitored system resource utilization exceeds the determined critical level for a predetermined period of time, determining based on the collected software information, if the first program conflicts with execution of second programs. The method further comprises determining whether conflicting second programs are harmful to the computer system and changing configuration settings of the first program to resolve conflicts with the conflicting second programs that are harmless to the computer system.

The above simplified summary of example embodiments of the invention serves to provide a basic understanding of such embodiments. This summary is not an extensive overview of all contemplated aspects of the invention, and is intended to neither identify key or critical elements of all embodiments nor delineate the scope of any or all embodiments. Its sole purpose is to present some concepts of one or more aspects in a simplified form as a prelude to the more detailed description that follows. To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example embodiments of the invention and, together with the detailed description serve to explain the principles and implementations of the embodiments.

In the drawings.

DETAILED DESCRIPTION OF EXAMPLE EMBODIMENTS

Example embodiments are described herein in the context of systems, methods and computer program products for adaptive configuration of conflicting computer programs. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
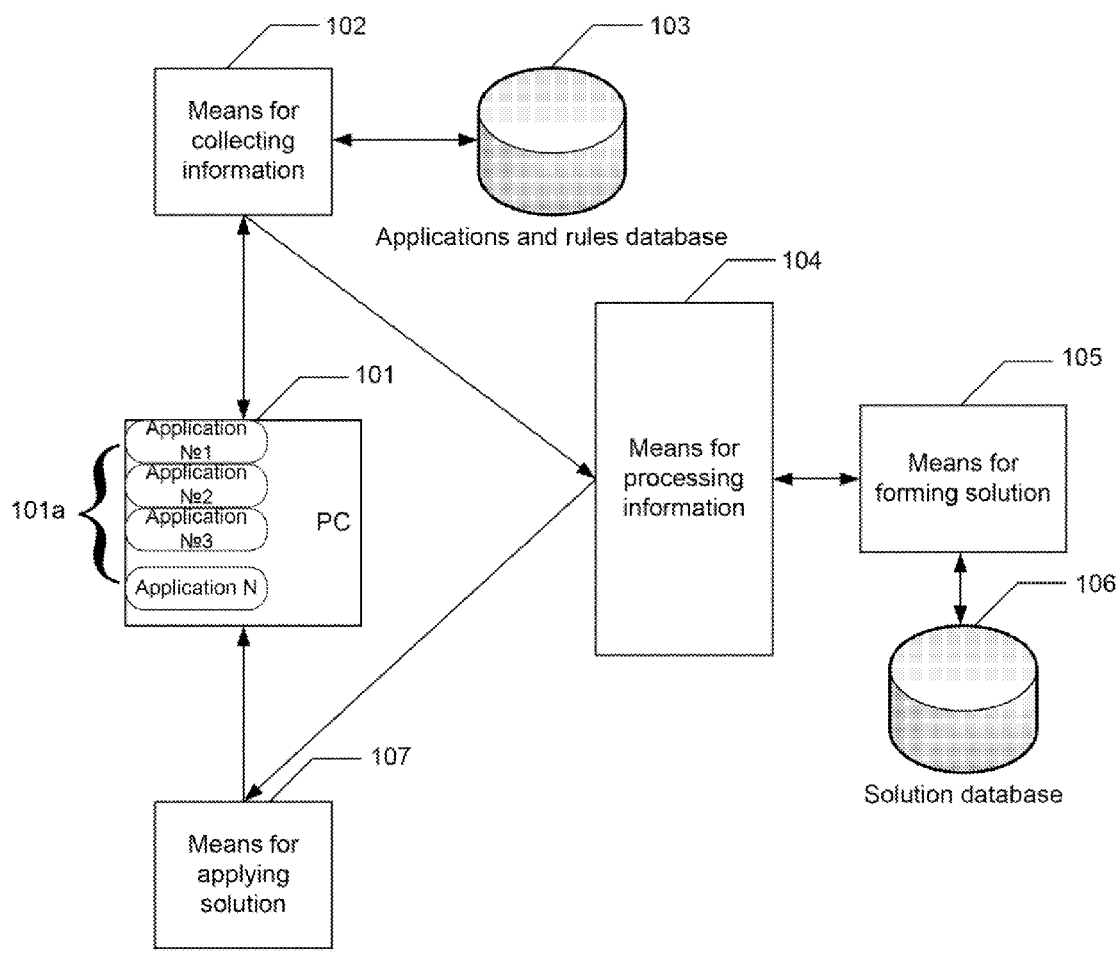
FIG. 1 illustrates a schematic block diagram of a system for adaptive program configuration in accordance with one example embodiment.

FIG. 1 illustrates a schematic block diagram of a system for improving performance of a computer system, such as a personal computer, by means of adaptive configuration of conflicting applications in accordance with one example embodiment of the invention. System 100 includes one or more personal computers ("PC") 101, each having a plurality of applications 102*a, b, c*, etc. A plurality of PCs 101 may be connected into a local area network. A PC 101 may be a desktop computer, a work station, a laptop computer, an application server or other type of processing device operable to run computer programs, such as applications 102*a, b, c, d*, etc. Applications 102 may include various computer programs, scripts, codes, plug-ins and other types of software executable on PCs 101. System 100 further includes at least one local software agent 103 that collects system configuration information, monitors system utilization, and applies changes to configuration of applications 102 running on PC 101. System 100 also includes a remote decision engine 104 that determines critical levels of system resource utilization, identifies conflicting applications and provides conflict resolutions. System 100 also includes database 105 containing rules for determining critical levels of system resource utilization, database 106 containing information about conflicting applications, and database 107 containing rules for conflict resolution. The above system configuration is not limiting, other software and hardware components as well as databases may be used in various embodiments.

In one example embodiment, applications 102 include an antivirus application 102*a* or other resource-intensive application that are installed on each PC 101. Alternatively, antivirus application 102*a* may be installed on a separate application server or other network device that services several PCs 101 located on the same network. A resource-intensive application is an application that utilizes large amount of system resources of PC 101, such as CPU time, memory, network and other computer resources. As explained above, antivirus program 102*a* may interfere or conflict with execution of other programs 102*b, c, d*, etc. installed on PC 101. For example, antivirus program 102*a* may limit access of conflicting applications to various system resources, such as memory, system registry, network and other or can even terminate execution of a conflicting program. This interference may load or even overload PC 101. To prevent or mitigate these problems, in accordance with one example embodiment, the system for adaptive configuration of conflicting applications can be automatically activated when utilization of PC 101 reaches a critical level or another threshold. In another example embodiment, the system may automatically activate when a known conflicting application 102*b, c* or *d* executes concurrently with the antivirus program 102*a* or other conflicting resource-intensive application.

In one example embodiment, a software agent 103 may be installed on each PC 101. In another embodiment, software agent 103 may be installed on a separate application server or other network device that services PCs 101 located on the same network. Agent 103 may be implemented as a standalone program, as a component of the antivirus program 102*a*, as a script or other type of executable, compilable or interpretable code. In one example embodiment, software agent 103 performs three primary functions: collecting system configuration information of PCs 101, monitoring system resource utilization on PCs 101, and adjusting configuration setting of conflicting applications to improve system resource utilization. As shown in FIG. 1, software agent 103 may access services provided by remote decision engine 104 and databases 105, 106, and 107 via network 108, such as the Internet. In another example embodiment, functionality of decision engine 104 and databases 105, 106 and 107 may be implemented in software agent 103, so that all tasks are performed locally to PC 101. However, it may be desirable in some instances to separate the processes performed by software agent 103 from the processes performed by engine 104 and databases 105, 106 and 107, for example, in order to prevent additional loading of PC 101 on which software agent 103 may be running.

Figure 2:
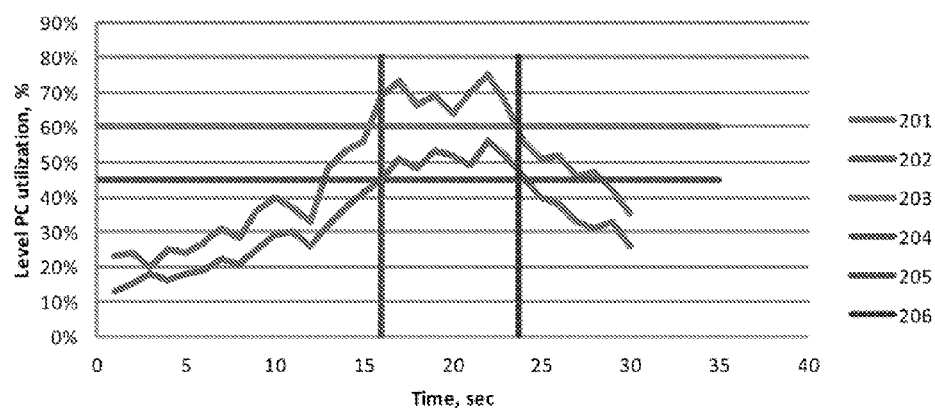
FIG. 2 illustrates an example of interaction between components of a system for adaptive program configuration in accordance with one example embodiment.

In one example embodiment, software agent 103 may be configured to auto start upon boot-up of PC 101. Alternatively, software agent 103 may be activated by the PC user, system administrator, antivirus application 102*a* or other application. Once activated, software agent 103 begins collecting system configuration information, including hardware and software information of PC 101. The collected hardware configuration information may include, but is not limited to, type and frequency of the CPU, such as Intel® Core 2 Quad 2.33 GHz Penryn®; type and amount of RAM, such as 4096 MB DDR3; size of the hard disk, such as 500 GB SATA; type of the graphics card, such as nVidia® GeForce® GT 240M; and other hardware-related information. The collected software configuration information may include, but is not limited to, type and version of the operating system, such as Windows Vista Service Pack 2; and software applications, programs, scripts and processes running on the PC 101, such as Half-Life® 2 Build 6500, DC++ and other programs. Software agent 103 may also collect other system information that indicates which software applications, programs and processes are executed on PC 101. The collected system configuration information for each PC 101 may be locally stored by software agent 103 or stored in a remote database, such as database 105, as shown in FIG. 2.

In one example embodiment, software agent 103 is also configured to monitor system resource utilization of PCs 101, including overall system resource utilization and/or resource utilization by antivirus program 102*a*, or other resource-intensive application. System resource utilization may include, but is not limited to, CPU utilization, RAM utilization, hard disk utilization, and other parameters. Software agent 103 may be configured to determine (i) when overall system resource utilization is above a critical level for a predetermined period of time, and/or (ii) when system resource utilization by the antivirus program 102*a*, or other resource-intensive-application, is above a critical level for a predetermined period of time. The critical levels of system resource utilization and duration of period in which PC 101 operates above critical levels may be determined by decision engine 104 as will be described in detail below.

Figure 3:
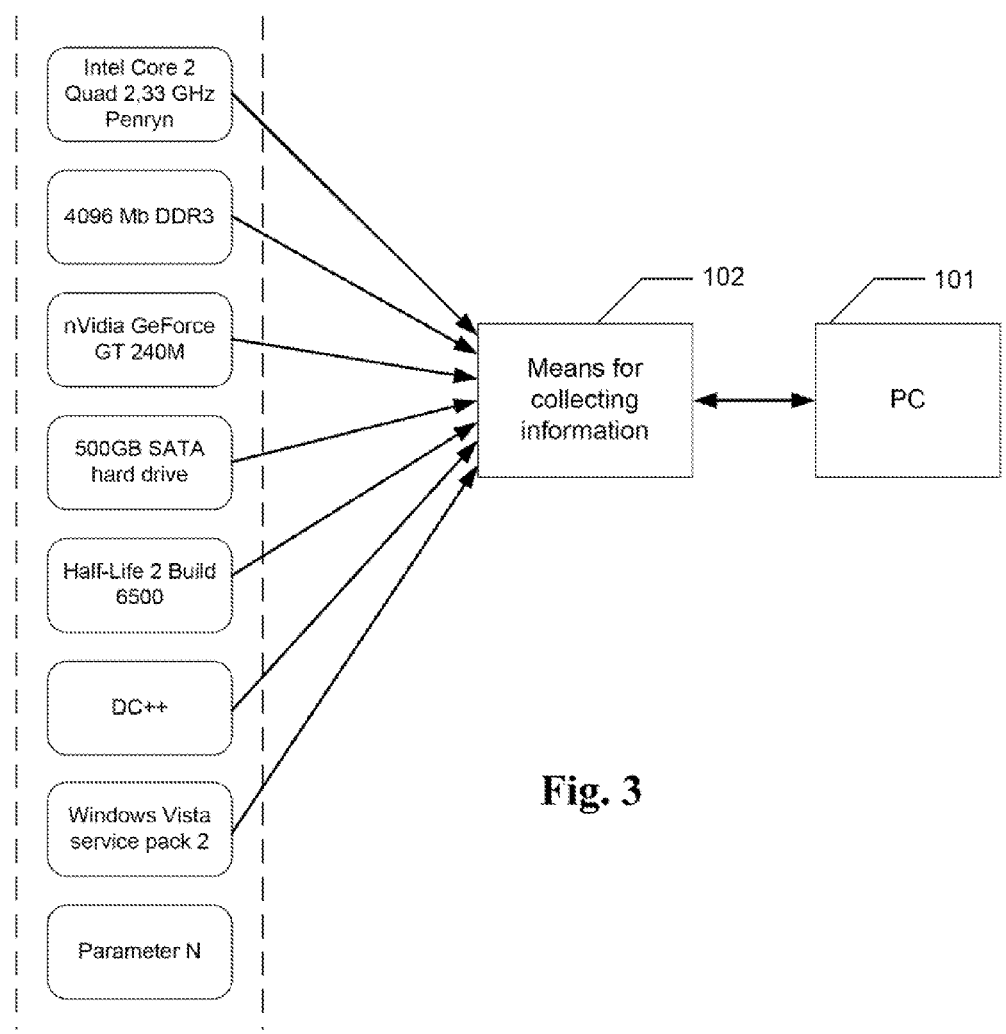
FIG. 3 illustrates exemplary graphs of dependences of overall system load and system load by a resource-intensive program.

FIG. 3 illustrates exemplary graphs of dependencies of the overall system resource utilization and program-specific system resource utilization by a resource-intensive program, such as an antivirus program 102*a*, as percentage of total system utilization versus time of system operation. As shown, software agent 103 detects changes in the overall system resource utilization 301 and program-specific system resource utilization 302 for the duration of 30 seconds. The critical level of the overall system resource utilization 203 is set at 60% and the critical level of program-specific system resource utilization 304 is set to 45%. Time mark 305 indicates that both that overall system resource utilization 301 and program-specific system resource utilization 302 have reached critical levels 303 and 304, respectively, at about 16 second. Time mark 306 indicates that overall system resource utilization 301 and program-specific system resource utilization 302 fell below critical levels 303 and 304, respectively, at about 24 seconds. When software agent 103 determines that overall system resource utilization 301 and/or program-specific system resource utilization 302 exceed respective critical levels 303 and 304 for a predetermined period of time, for example, five seconds, software agent 103 may be configured to reconfigure settings of antivirus program 102*a* to remove conflicts and bring system resource utilization below critical levels as will be described in detail below.

Figure 4:
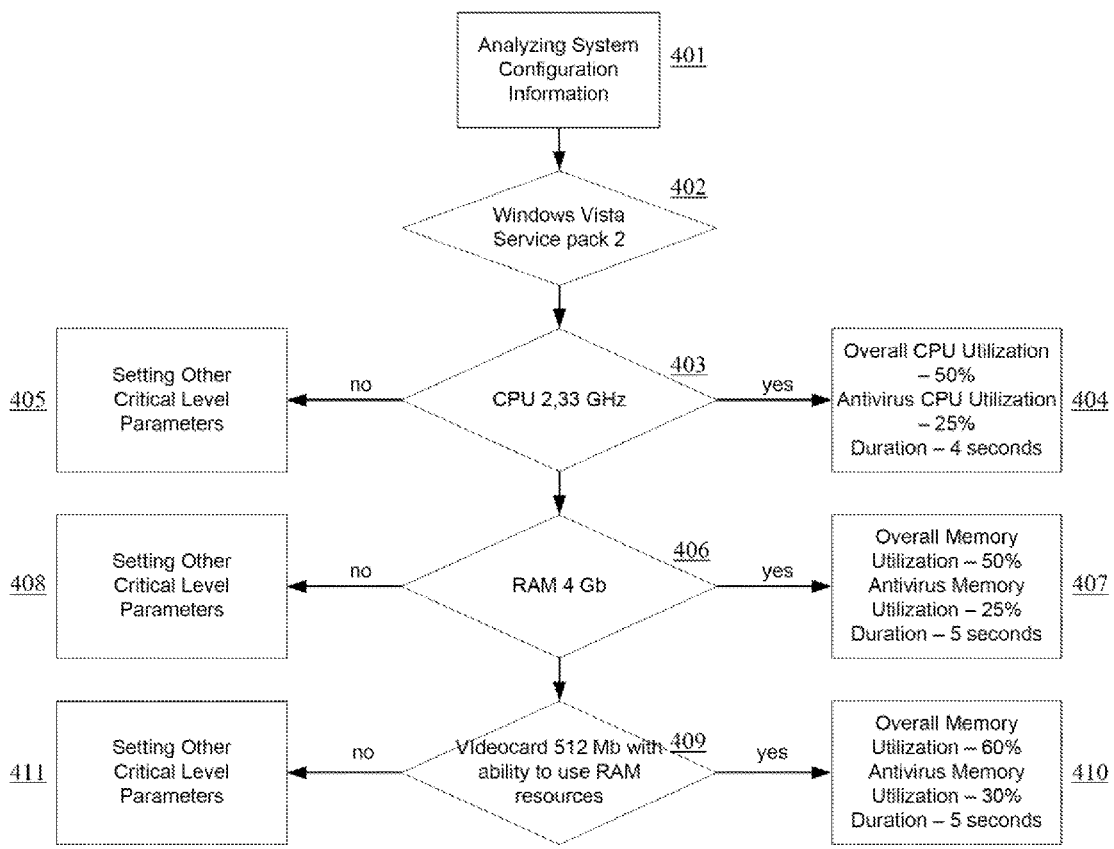
FIG. 4 illustrates an exemplary algorithm for determining critical levels of system resource utilization based on non-fuzzy logic rules.

In one example embodiment, the critical levels of system resource utilization are computer specific and are determined by decision engine 104 for each PC 101 separately based on specific system configuration of each PC 101. To that end, decision engine 104 uses hardware and software configuration information of PC 101 collected and provided by software agent 103 to determine critical levels of system resource utilization for PC 101. In one example embodiment, the determination of these critical levels may be based on system utilization rules stored in database 105. FIG. 4 illustrates an exemplary algorithm for determining critical levels of overall system resource utilization and program-specific system resource utilization based on non-fuzzy ("crisp") logic rules stored in database 105. First, decision engine 104 retrieves and analyses system configuration information of PC 101 (step 401). Decision engine 104 then determines what operating system is running on PC 101 (step 402), which, in the given example, is Windows Vista Service Pack 2. It is important to note that an operating system in large part controls system resource allocation in a computer system and different operating system do it differently. Some operating systems allow greater overall system resource utilization and system resource utilization by a single program, while others impose stricter limits on system resource utilization. Therefore, database 105 contains different rule sets controlling selection of different critical levels of system resource utilization and duration thereof for different operating systems.

Next, processor information is analyzed (step 403), and critical level and duration parameters are selected (steps 404 and 405). If operating frequency of the processor is 2.33 GHz (step 403), then (step 404) critical level of overall system resource utilization is selected to be 50%, critical level of application-specific system resource utilization is selected to be 25%, and duration for system operation above critical levels is selected to be 4 seconds (step 404). If operating frequency of the processor is other than 2.33 GHz (step 403), then other parameter values may be selected (step 405). Next, memory information is analyzed (step 406) and critical level and duration parameters are adjusted appropriately (steps 407 and 408). For example, if amount of system memory is determined to be 4 GB (step 406), then critical level of overall system resource utilization is kept at 50% and critical level of application-specific system resource utilization is kept at 25%, but duration for system operation above critical levels may be extended to 5 seconds (step 407). If system memory is more or less than 4 GB (step 406), then parameters may be adjusted up or down differently (step 408). Next, graphics card information is analyzed (step 409) and critical level and duration parameters are adjusted appropriately (steps 410 and 411). If graphics card has 512 MB of internal memory and has ability to use system's RAM, then, at step 410, critical level of overall system resource utilization may be increased to 60%, critical level of application-specific system resource utilization may be increased to be 30%, but duration for system operation above these critical levels is kept at 5 seconds. If PC 101 has a different graphics card, then parameters may be adjusted up or down differently (step 411). The above analysis and parameter adjustments may be performed based on other system components that affect overall and application-specific system resource utilization. It should be also noted that database 105 may be periodically updated with rule sets that provide critical levels for newly-developed computer hardware, software, service patches, etc.

Figure 5:
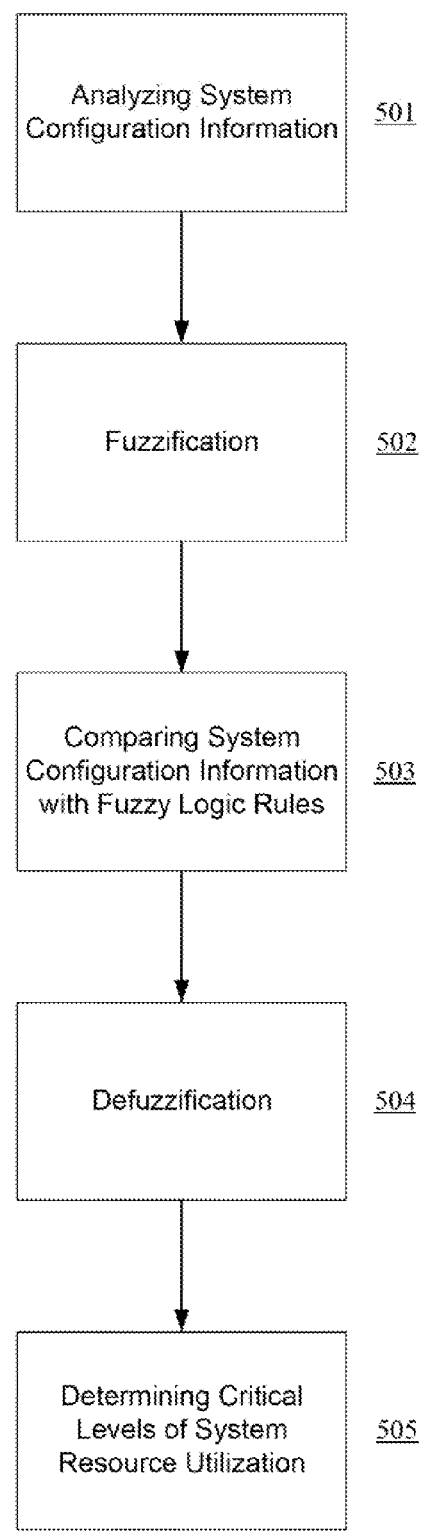
FIG. 5 illustrates an exemplary algorithm for determining critical level of overall system load and the system load by a resource-intensive software based on fuzzy logic.

FIG. 5 illustrates an exemplary algorithm for determining critical levels of overall system resource utilization and program-specific system resource utilization based on fuzzy logic rules in accordance with another embodiment. As shown, decision engine 104 receives and analyses system configuration information of PC 101 (step 501). Decision engine 104 then performs fuzzification—translation of non-fuzzy quantitative variables to fuzzy logic linguistic variables (step 502). Next, decision engine 104 compares fuzzy rule sets from the database 105 with the linguistic variables (step 503). As a result of this comparison, fuzzy logic rules corresponding to the linguistic variables are determined. Each fuzzy logic rule provides critical level of overall system resource utilization, critical level of application-specific system resource utilization and duration for system operation above critical levels of system resource utilization as linguistic values. Decision engine 104 then performs defuzzification—translation of fuzzy logic linguistic values to non-fuzzy quantitative values (step 504). The database 105 contains all necessary linguistic variables and the associated precise physical quantities in addition to the fuzzy logic rules necessary to perform fuzzification and defuzzification processes. Next, decision engine 104 determines the exact non-fuzzy values of critical level of overall system resource utilization, critical level of application-specific system resource utilization and duration of system operation above critical levels, and passes the same to software agent 103 (step 505).

An example application of the algorithm in FIG. 5 is provided next to select critical level parameters based on memory size of PC 101. Similar process may be applied to adjust the determined parameters based on processor, graphics card and other hardware and software components of PC 101. First, decision engine 104 determines that PC 101 has 4 GB of RAM (step 501). The database 105 contains a set of linguistic variables and associated values, including linguistic variable "size of RAM", which may have three associated linguistic values, such as "small", "medium" and "large". The database 105 also contains a set of numeric ranges, which correspond to the linguistic values of variable "size of RAM". For example, linguistic value "small" may correspond to memory in 0 to 2 GB range, linguistic value "medium" may correspond to memory in 2 GB to 5 GB range, and linguistic value "large" may correspond to memory of 5 GB and greater. Accordingly, during fuzzification (step 502), the actual size of RAM in PC 101 of 4 GB is translated to its fuzzy logic value of "medium". Next, the fuzzy value of RAM is compared to fuzzy logic rule from the database 103 (step 503). An exemplary fuzzy logic rule may state "IF size of RAM IS medium, THEN critical level of overall system resource utilization AND critical level of program-specific system resource utilization AND duration of system operation above critical levels ARE standard." Therefore, the rule provides that "critical level of overall system resource utilization" variable, "critical level of program-specific system resource utilization" variable and "duration of system operation above critical levels" variable have "standard" values. Accordingly, during defuzzification (step 504), fuzzy values "standard" are translated from their linguistic form to the non-fuzzy quantitative form. To this end, database 105 contains numeric ranges corresponding to "standard" values of "critical level of overall system resource utilization" variable, "critical level of program-specific system resource utilization" variable and "duration of system operation above critical levels" variable. For example, the "standard" value of "critical level of overall system resource utilization" variable may correspond to a value in a range of 50% to 60% of system resource utilization; the "standard" value of "critical level of program-specific system resource utilization" variable may correspond to a value in range of 30% to 40% of system resource utilization; and the "standard" value of "duration of system operation above critical levels" variable may correspond to a value in range of 5 to 10 seconds. Accordingly, appropriate non-fuzzy quantitative values for these fuzzy variables are selected from the specified "standard" ranges (step 505).

Once critical levels of system resource utilization and duration of system operation above these critical levels are determined, software agent 103 begins to monitor overall system resource utilization and/or application-specific system resource utilization by the antivirus program 102a or other resource-intensive application. When software agent 103 determines that one or more critical levels of system resource utilization have been exceeded for the predetermined duration, it can collect information about operation of the antivirus program 102a or other resource intensive applications, including information about current configuration of antivirus program 102a, information about tasks being performed by the program 102a, information about files being scanned or accessed by the program 102a within a short period of time, such as 2-3 minutes, and information about system resource being utilized by various applications, programs, processes and scripts concurrently executing with program 102a.

In sum, the following system configuration information about PC 101 has been collected:

Information about hardware and software configuration of PC 101, including information about its CPU, RAM, hard disk, operating system and other system components.

Information about execution of the antivirus program 102a or other resource-intensive application, including configuration information, task being performed, recently accessed/scanned files and other information affecting system resource utilization.

Information about other program concurrently running on the PC 101.

Information about overall system resource utilization and program-specific system resource utilization by the antivirus program 102a, such as utilization of CPU, RAM, etc.

Next, software agent 103 may pass the collected software configuration information to decision engine 104, which performs analysis of software configuration information to identify conflicting applications running on PC 101 and reconfigure settings of antivirus program 102a to remove interference with conflicting applications using information about known conflicting applications stored in database 106 and conflict resolution rules stored in database 107. It should be noted that in one example embodiment the software agent 103 may pass collected software configuration information to decision engine 104 before critical levels of system resource utilization have been reached, so that decision engine 104 may preemptively begin the process of identification of any possible conflicting applications. In one example embodiment, decision engine 104 may access database 106 for information about known conflicting programs and, in particular, information about known applications, programs, processes, script, plug-ins and other software codes execution of which may be conflicted or interfered with by antivirus program 101a or other resource-intensive application running on PC 101. In one example embodiment, decision engine 104 may access database 107 for crisp and fuzzy logic rules used by the decision engine 104 for resolving application conflicts. In particular, conflict resolution rules provide adjustments to configuration settings of antivirus program 102a, thus resolving conflicts with conflicting applications 102b, c or d.

Figure 6:
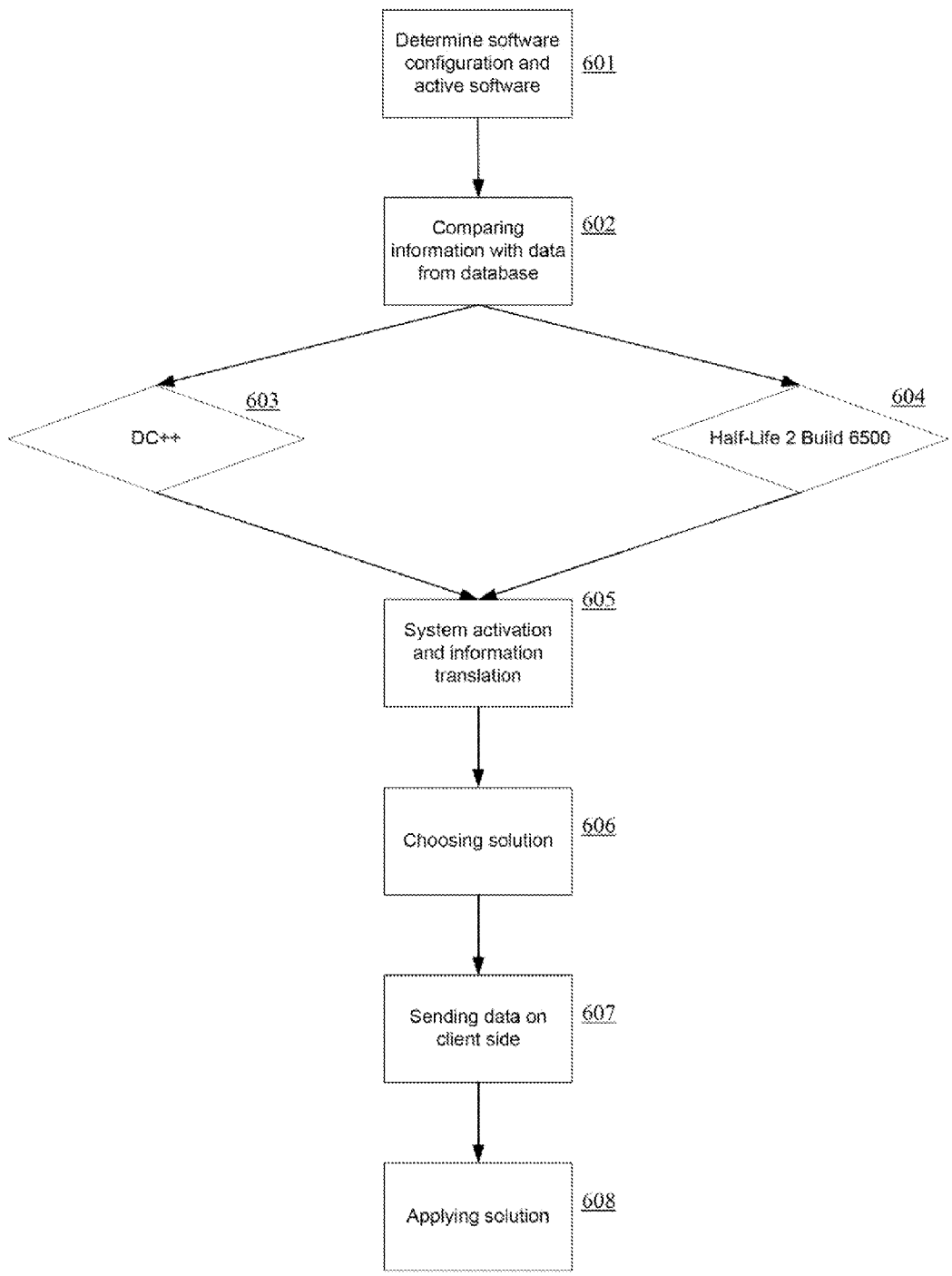
FIG. 6 illustrates an exemplary algorithm of adaptive program configuration.

FIG. 6 illustrates an exemplary algorithm for improving system resource utilization via adaptive program configuration in accordance with one example embodiment. As shown, decision engine 104 analyses software configuration information of PC 101 provided by software agent 103 (step 601). This information may include information about execution of antivirus program 102a, such as program configuration information, tasks being performed by the program, recently accessed/scanned files and memory sectors, and other program information, as well as information about other programs currently running on PC 101. Information identifying specific programs running on PC 101 may include names of processes and threads created by programs 102 on PC 101, locations of programs in the system memory, names and titles of authorized program users and other information. Decision engine 104 then identifies conflicting programs (step 602) by comparing collected software configuration information with information about known conflicting applications stored in database 106, which may be constantly updated with information about new conflicting programs. For example, decision engine 104 may identify two conflicting programs running on PC 101, such as DC++ and Half Life 2 Build 6500. Interference with operation of these two programs by antivirus program 102a or other resource intensive program may have raised system resource utilization above critical levels.

Next, decision engine 104 may determine using application information from database 106 if detected conflicting program(s) is malicious (step 603). Malicious computer programs typically include viruses, warms, Trojan horses, spyware and other types of malware that can cause harm to PC 101. Although such malicious programs should be detected by antivirus application 102a running on PC 101, the antivirus program 102a might miss a new breed of malware because of outdated malware definitions database or other reasons. Since conflicting applications database 106 is located remotely from PC 101 and being constantly updated with information about new malicious and conflicting programs, decision engine 104 provides an extra level of security against new malicious programs. If the detected program(s) is in fact malicious (step 603), decision engine 104 may forward information about malicious conflicting program(s) to software agent 103 (step 604), which in turn notifies antivirus software 102a about malicious program running on PC 101 (step 605). Using the provided information about the malicious program, antivirus application 102a can take appropriate remedial actions (step 606), such as removing malicious code from the conflicting program(s), deleting the malicious program(s) from PC 101, or terminating and quarantining the malicious program(s), so that a system administrator can decide what to do with the malicious program(s) at a later time.

If decision engine 104 determines that conflicting program(s) is not malicious (step 603), it may search database 107 to identify appropriate conflict resolution rules (step 607). In one example embodiment, conflict resolution rules may identify which configuration settings of antivirus application 102a may be changed in order to remove interference with operation of conflicting non-malicious programs, such as CD++ and Half Life 2 Build 6500. For example, it is known that antivirus application 102a blocks ports on PC 101, which are used during execution of DC++, thereby interfering with operation of the program. One solution for this conflict would be to reconfigure setting of antivirus program 102a to allow DC++ access to the required ports. It is also known that a majority of files used by Half Life 2 build 6500 are stored in archives, and every time this program tries to access archived files, antivirus application 102a is configured to perform antivirus scan of the accessed files, which slows down operation of Half Life 2. One solution for this conflict would be to reconfigure antivirus program 102a not to scan for viruses archived files that are accessed by Half Life 2 build 6500. Having identified conflict solution(s), decision engine 104 may send new configuration setting to software agent 103 (step 608), which in turn applies them to the antivirus application 102a, thereby removing interference with conflicting non-malicious applications, and, therefore, improving overall system resource utilization and application-specific system resource utilization by the antivirus application 102a.

As indicated above, decision engine 104 determines new configuration setting for the antivirus program 102a by matching information about conflicting programs with an appropriate conflict resolution rule stored in database 107. In one example embodiment, the conflict resolution rules are based on fuzzy logic. In this case, decision engine 104 implements the following three-step process for determining new configuration setting for the antivirus program 102a. First, decision engine 104 performs fuzzification, which involves translating information about operation of the antivirus program 102a and information about conflicting programs, to fuzzy logic linguistic variables. Second, decision engine 104 compares these linguistic variables with fuzzy logic rules stored in database 107 to determine an appropriate conflict resolution rule(s). Each fuzzy logic rule describes conflict solution(s) in linguistic form. Thirds, decision engine 104 performs defuzzification, which involves translation of fuzzy logic conflict solution(s) to actual configuration setting for the antivirus application 102a, examples of such solutions are presented in paragraph above. These configuration setting are then applied to the antivirus application 102a to improve overall system resource utilization and application-specific system resource utilization by the antivirus application 102a running on PC 101. In alternative embodiments, conflict resolution rules may be implemented using non-fuzzy logic.

Figure 7:
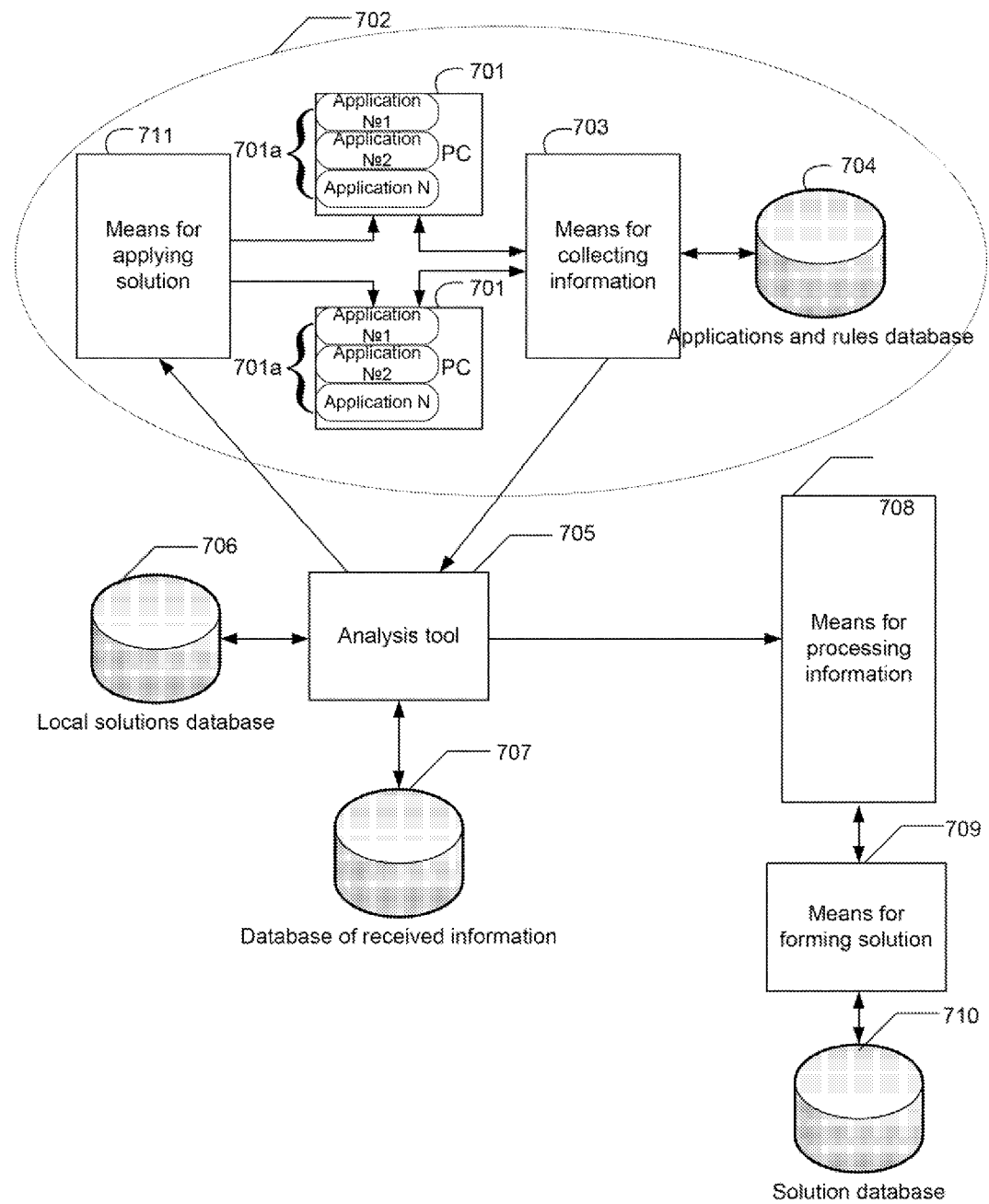
FIG. 7 illustrates a schematic block diagram of a computer system in accordance with one example embodiment.

FIG. 7 depicts an exemplary computer system 5, which can be used to implement PC 101, in accordance with one example embodiment. It should be noted that computer system 5 may also be used to implement a desktop computer, a workstation, a laptop computer, an application server or other type of data processing device. As depicted, computer system 5 includes CPU 15, system memory 20, hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include Intel® Core 2 Quad 2.33 GHz processor or other type of microprocessor.

System memory 20 includes a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® Vista® or other type of OS, that is responsible for management and coordination of processes and allocation and sharing of hardware resources in computer system 5. System memory 20 also stores applications and programs 25 that are currently running on the computer 5, including an antivirus application and various other programs. System memory 20 also stores various runtime data 26 used by the applications and programs 25.

Computer system 5 may further include hard disk drive(s) 30, such as 500 GB SATA magnetic hard drive, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. Computer system 5 may also include graphics card 45, such as nVidia® GeForce® GT 240M or other video card, for interfacing with a monitor 60 or other video reproduction device. Computer system 5 may also include an audio card 50 for reproducing sound via internal or external speakers 65. In addition, computer system 5 may include network card(s) 55, such as Ethernet, WiFi, GSM, Bluetooth or other wired, wireless, or cellular network interface for connecting computer system 5 to network 70, such as the Internet.

As used in this application, the terms "system," "component," "agent" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various non-transitory computer-readable medium having various data structures stored thereon. The components may communicate by way of local and/or remote processes such as in accordance with a signal having one or more data packets, such as data from one component interacting with another component in a local system and/or across a network, such as the Internet with other systems.

In various embodiments, the algorithms and methods described herein may be implemented in hardware, software, firmware, or any combination thereof. If implemented in software, the functions may be stored or transmitted as one or more instructions or code on a non-transitory computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs usually reproduce data optically with lasers. Combinations of the above should also be included within the scope of computer-readable media.

In the interest of clarity, not all of the routine features of the implementations described herein are shown and described. It will be appreciated that in the development of any such actual implementation, numerous implementation-specific decisions must be made in order to achieve the developer's specific goals, such as compliance with application-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A method for adaptive program configuration, the method comprising:
   collecting system configuration information from a computer system, the configuration information includes system hardware and software information;
   monitoring system resource utilization during execution on the computer system of a first program and one or more second programs;
   determining one or more critical levels of system resource utilization by applying fuzzy logic rules to the collected system configuration information;
   when the monitored system resource utilization exceeds the determined critical level for a predetermined period of time, determining, based on the collected software information, whether the first program conflicts with execution of one or more second programs;
   determining whether one or more conflicting second programs are harmful to the computer system; and
   changing configuration settings of the first program to resolve conflicts with the one or more conflicting second programs that are harmless to the computer system.

2. The method of claim 1, wherein the first program is an antivirus program.

3. The method of claim 2, wherein the critical levels of system resource utilization include:
   a critical level of system resource utilization by the entire computer system; and
   a critical level of system resources utilization only by the first program.

4. The method of claim 3, further comprising determining configuration setting for the first program by applying fuzzy logic rules to the collected software configuration information.

5. The method of claim 4, wherein determining whether one or more conflicting second programs are harmful to the computer system further comprises providing to the first program information about one or more harmful second programs in order for the first program to take remedial actions, including repairing the harmful second programs, quarantining the harmful second programs, or deleting the harmful second programs from the computer system.

6. The method of claim 5, further comprising providing a software agent, local to the computer system, for collecting system configuration information, monitoring system resource utilization, providing to the first program information about one or more harmful conflicting second programs, and changing configuration setting of the first program.

7. The method of claim 6, further comprising providing a decision engine, remote from the computer system, for determining critical levels of system resource utilization, determining whether the first program conflicts with execution of one or more second programs, determining whether conflicting second programs are harmful to the computer system, providing information about harmful conflicting programs, and determining configuration setting for the first program.

8. A system for adaptive program configuration comprising:
- a software agent embedded in a non-transitory computer-readable storage medium configured to
  - collect system configuration information from a local computer system, the configuration information includes system hardware and software information;
  - monitor system resource utilization during execution on the computer system of a first program and one or more second programs;
  - determine when the monitored system resource utilization exceeds one or more critical levels for a predetermined period of time; and
  - change configuration settings of the first program to reduce system resource utilization below the one or more critical levels; and
- a decision engine embedded in a non-transitory computer-readable storage medium configured to
  - determine the one or more critical levels of system resource utilization by applying fuzzy logic rules to the collected system configuration information;
  - determine, based on the collected software information, whether the first program conflicts with execution of one or more second programs; and
  - determine configuration settings for the first program to resolve conflicts with the one or more conflicting second programs that are harmless to the computer system, thereby reducing system resource utilization below critical levels.

9. The system of claim 8, wherein the first program is an antivirus program.

10. The system of claim 8, wherein the critical levels of system resource utilization include:
- a critical level of system resource utilization by the entire computer system; and
- a critical level of system resources utilization only by the first program.

11. The system of claim 8, wherein the decision engine further configured to determine configuration setting for the first program by applying fuzzy logic rules to the collected software configuration information.

12. The system of claim 8, wherein the decision engine further configured to determine whether one or more conflicting second programs are harmful to the computer system.

13. The system of claim 12, wherein the decision engine further configured to provide to the software agent information about one or more harmful conflicting second programs.

14. The system of claim 13, wherein the software agent further configured to instruct the first program to take remedial actions, including repairing the harmful second programs, quarantining the harmful second programs, or deleting the harmful second programs from the computer system.

15. A computer program product embedded in a non-transitory computer-readable storage medium, the computer-readable storage medium comprising computer-executable instructions for:
- collecting system configuration information from a computer system, the configuration information includes system hardware and software information;
- monitoring system resource utilization during execution on the computer system of a first program and one or more second programs;
- providing the collected system configuration information to a remote service for determining one or more critical levels of system resource utilization based on fuzzy logic rules;
- when the monitored system resource utilization exceeds the determined one or more critical levels for a predetermined period of time, providing the collected software configuration information to the remote service for determining whether the first program conflicts with execution of one or more second programs and whether the one or more second programs are harmful to the computer system; and
- changing configuration settings of the first program to resolve conflicts with the one or more conflicting second programs that are harmless to the computer system.

16. The medium of claim 15, wherein the first program is an antivirus program.

17. The medium of claim 15, wherein the critical levels of system resource utilization include:
- a critical level of system resource utilization by the entire computer system; and
- a critical level of system resources utilization only by the first program.

18. The medium of claim 15, further comprising instruction for receiving from the remote service information about harmful second programs.

19. The medium of claim 18, further comprising instructions for instructing the first program to take remedial actions, including repairing the harmful second programs, quarantining the harmful second programs, or deleting the harmful second programs from the computer system.

20. The medium of claim 17, further comprising providing the collected software configuration information to the remote service when both the critical level of system resource utilization by the entire computer system and the critical level of system resources utilization only by the first program are exceeded for the predetermined period of time.

* * * * *